| United States Patent [19] | [11] Patent Number: 5,085,835 |
|---|---|
| Weber et al. | [45] Date of Patent: Feb. 4, 1992 |

[54] PROCESS FOR RECOVERING RHODIUM

[75] Inventors: Jürgen Weber, Oberhausen; Ludger Bexten, Hünxe; Dieter Kupies, Duisburg; Peter Lappe, Dinslaken; Helmut Springer, Oberhausen, all of Fed. Rep. of Germany

[73] Assignee: Hoechst Aktiengesellschaft, Fed. Rep. of Germany

[21] Appl. No.: 750,709

[22] Filed: Aug. 20, 1991

Related U.S. Application Data

[63] Continuation of Ser. No. 409,119, Sep. 19, 1989, abandoned.

[30] Foreign Application Priority Data

Oct. 1, 1988 [DE] Fed. Rep. of Germany ....... 3833427

[51] Int. Cl.$^5$ .................................................. C22B 3/26
[52] U.S. Cl. ............................ 423/22; 423/DIG. 14
[58] Field of Search .......................... 423/22, DIG. 14

[56] References Cited

U.S. PATENT DOCUMENTS

| 3,251,646 | 5/1966 | Alon et al. | 23/50 |
| 3,547,964 | 12/1970 | Olivier | 260/429 |
| 4,135,911 | 1/1979 | Balmat | 75/371 |
| 4,434,240 | 2/1984 | Pugach | 423/22 |

FOREIGN PATENT DOCUMENTS 3626536 2/1988 Fed. Rep. of Germany .
1283389 7/1972 United Kingdom .

*Primary Examiner*—Melvyn J. Andrews
*Attorney, Agent, or Firm*—Jordan B. Bierman

[57] ABSTRACT

A process for recovering rhodium from an aqueous solution containing its complex compounds and optionally complex ligands in the presence of a water-soluble salt of a carboxylic acid by treatment of the aqueous solution at 20° to 120° C. with hydrogen peroxide (or a substance forming hydrogen peroxide) and with oxygen (or an oxygen-containing gas). The rhodium is then removed as a water-insoluble compound.

69 Claims, No Drawings

PROCESS FOR RECOVERING RHODIUM

This application is a continuation of application Ser. No. 07/409,119 filed Sept. 19, 1989, now abandoned.

The present invention relates to a process for recovering rhodium from aqueous solutions containing rhodium complex compounds and optionally complex ligands.

BACKGROUND OF THE INVENTION

Together with complex ligands used in excess, the rhodium complex compounds form inter alia, a catalyst system which—as described in the DE-PS 26 27 354—is used for the hydroformylation of olefins. Under the reaction conditions, the catalyst system is formed from rhodium and excess water-soluble organic phosphines. Its water-solubility is due to the presence of sulfonic acid groups which are in the organic phosphines. The phosphorus ligands are preferably alkali sulfonate, ammonium sulfonate, or alkaline earth sulfonate.

With prolonged use of the catalyst system, the selectivity of the reaction decreases. This loss of selectivity is due to (1) the effects of catalyst poisons, such as iron carbonyl, which can form through the action of carbon monoxide on the wall of the reactor, (2) the formation of higher-boiling condensation products from the aldehydes, and (3) the decrease in the sulfonated phosphine due to oxidation to phosphine oxides or decomposition to aromatic sulfonic acids. In addition, phosphine sulfides also form from the phosphines and the sulfur compounds contained in the synthesis gas as well as from reduction of sulfonic acid groups.

As neither phosphines oxides, phosphine sulfides, nor aromatic sulfonic acids are desirable in the hydroformyation catalyst, the spent catalyst solution must be replaced. For economic reason, it is necessary to separate and recover the rhodium from this catalyst solution. It is of paramount importance that the rhodium be recovered as completely as possible in a form which permits reuse as a catalyst component.

DE-OS 36 26 536 teaches a process for recovering rhodium from aqueous solutions containing rhodium complex compounds. An excess, based on the rhodium, of a water-soluble salt of a carboxylic acid with 7 to 22 carbon atoms is added to the solution, the solution is then treated at 50° to 200° C. with an oxidant, and the precipitated rhodium is separated. In this manner, approximately 90 to 95% of the rhodium present in the solution can be recovered. Oxygen, air, or hydrogen peroxide can all be used as oxidants. However, it has been shown that the percentage recovered depends quite substantially on the type of solution. Unforeseen changes, which presumably occur due to ageing and the reaction conditions under which the solution is used as a catalyst, impede trouble-free rhodium recovery.

The rhodium which is not recovered can, however, be separated only at great cost; for example, by oxidation at high temperatures and pressures or thermal decomposition, if necessary with the aid of a support material such as activated carbon, onto which the rhodium is precipitated. With this process, the rhodium is recovered either as a metal or in the form of compounds which can no longer be used directly as catalyst components, in particular for hydroformylation.

DESCRIPTION OF THE INVENTION

The basic idea behind the present invention was to find a process which eliminates the above-mentioned disadvantages and which permits the rhodium to be recovered from the aqueous solution as completely as possible in a simple manner, while ensuring that the rhodium is obtained in a form which is suitable for reuse as a catalyst.

Surprisingly, this problem is solved by a process for recovering rhodium from aqueous solutions containing rhodium complex compounds and optionally complex ligands by treatment of the solution with an oxidant in the presence of an excess, based on the rhodium, of a water-soluble salt of a carboxylic acid with 7 to 22 carbon atoms, followed by separation of the rhodium as a water-insoluble compound. It is characterized in that the aqueous solution is treated at 20° to 120° C. with hydrogen peroxide, or a substance forming hydrogen peroxide, and with an oxygen or an oxygen-containing gas.

The claimed procedure is generally suitable for recovering rhodium from rhodium complex compounds dissolved in water, which are used, for example, as a catalyst solution in the hydroformylation of olefins. The process is particularly desirable for the separation of rhodium from spent, largely deactivated catalyst solutions, such as occur after prolonged use in the hydroformylation of olefins. With the aid of the process, it is possible to separate the rhodium generally present in low concentration from the aqueous solution with surprisingly high selectivity and yield. The rhodium recovered in this manner can be used directly as a catalyst component. The solutions subjected to the recovery process contain the rhodium complex, optionally excess complex ligands as well as their degradation and conversion products dissolved in water.

The rhodium complex corresponds to the general formula $HRh(CO)_xL_{4-x}$, where L stands for water-soluble ligands and x corresponds to the numbers 1–3. The water-soluble complex ligands are, in particular, phosphines of the formula:

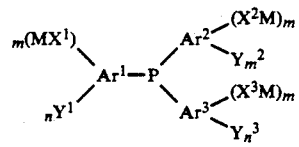

wherein $Ar^1$, $Ar^2$, and $Ar^3$ are each a phenyl or naphthyl group; $Y^1$, $Y^2$, and $Y^3$ each denote a straight or branched chain alkyl group with 1 to 4 carbon atoms, an alkoxy group; a halogen atom, an OH, CN, $NO_2$ or $R^1R^2N$ group, in which $R^1$ and $R^2$ each stand for a straight or branched chain or alkyl group with 1 to 4 carbon atoms; $X^1$, $X^2$ and $X^3$ are each a carboxylate (COO—) and/or a sulfonate ($SO_3$—) group; $n_1$, $n_2$, $n_3$ are the same or different integers from 0 to 5; M is an alkali metal ion, an alkaline earth metal ion, a zinc ion, or an ammonium or quaternary alkylammonium ion of the formula $N(R^3R^4R^5R^6)^+$, in which $R^3$, $R^4$, $R^5$, $R^6$ each stand for a straight or branched chain alkyl group with 1 to 4 carbon atoms; and $m_1$, $m_2$, $m_3$ are the same or different integers from 0 to 3, at least one of $m_1$, $m_2$ or $m_3$ being equal to or greater than 1.

The rhodium is present in a concentration of 10 to 2000, in particular 30 to 350, preferably 50 to 250 ppm by weight. Through the addition of hydrogen peroxide, additional water gets into the reaction so that the original solution is diluted to some extent. Since a very substantial dilution of the solution to be processed does not have a favorable effect on the oxidation, the rhodium content during oxidation should preferably correspond approximately to the value given for the aqueous solution used. The aqueous solution contains 0.5 to 15, in particular 0.7 to 8, preferably 0.8 to 4.0% by weight of water-soluble complex ligands. In addition, degradation and conversion products of the water-soluble complex ligands are in the solution. These include phosphine oxides and phosphine sulfides containing organic substituents, sulfonic acids, phosphinic acids, carboxylic acids, and salts of the foregoing. They are present in a concentration of 1 to 15, in particular 3 to 12, preferably 5 to 10% by weight, based on the aqueous solution.

The salt residue, calculated as dry weight, is 1.5 to 30, in particular 4.0 to 20, preferably 6.0 to 18% by weight, related to the aqueous solution. The salt residue is understood to be the sum of all salt components, i.e. the rhodium complex ligands and their degradation and conversion products.

In the case of a hydroformylation catalyst, the aqueous solution exhibits a total of 0.15 to 4.0, in particular 0.8 to 3.0, preferably 1.0 to 1.5% by weight of organic components, related to the aqueous solution. These include the olefin used, aldehydes, alcohols, aldols, condensation products and optionally solubilizers. The purpose of the solubilizers is to change the physical properties of the interface between the organic olefin-containing phase and the aqueous catalyst phase and to promote the transfer of the organic reactants into the catalyst solution and those of the water-soluble catalyst system into the organic phase.

The aqueous rhodium-containing solution is mixed with an excess, based on the rhodium of water-soluble salts of carboxylic acids. The acids have 7 to 22, preferably 8 to 13, carbon atoms. These salts include those of aliphatic, cycloaliphatic, aromatic and/or araliphatic carboxylic acids. As carboxylic acids, the monocarboxylic acids of the foregoing series are well suited to the present invention; in particular, branched aliphatic monocarboxylic acids, especially 2-ethylhexanoic acid, isononanoic acid (prepared by the hydroformylation of diidobutylene and subsequent oxidation of the hydroformylation product) and/or isotridecanoic acid (prepared by the hydroformlation of tetrapropylene and subsequent oxidation of the hydroformylation product) are desirable. Furthermore, phenylacetic acid and $\alpha$ and $\beta$ naphthoic acid have proved to be useful.

As water-soluble carboxylic acid salts of the foregoing, the alkali and/or ammonium salts, in particular sodium and/or potassium salts, and most preferably, sodium salts are used. Per gram atom of rhodium, 10 to 500, in particular 30 to 300, preferably 50 to 200 moles of carboxylic acid salt are added to the aqueous solution.

According to a special modification, the claimed process can be performed in a single stage wherein the aqueous solution is treated simultaneously with hydrogen peroxide (or a hydrogen peroxide-forming substance) and oxygen (or an oxygen-containing gas). However, the rhodium recovery results which are attainable with this one-stage process, can often be further improved by a two-stage process. With this two-stage process, the aqueous solution is treated with hydrogen peroxide (or a hydrogen peroxide-forming substance) at 20° to 100° C. in a first stage, and with oxygen (or an oxygen-containing gas) at 80° to 120° C. in the second stage.

The hydrogen peroxide can be used as a 30% aqueous solution, but also diluted, for example, in a 3% concentration. The useful hydrogen peroxide-forming substances include inorganic peroxides, persulfates, and peroxidesulfates.

In order to achieve uniform result regardless of the concentration of the hydrogen peroxide solution used as an oxidant, the same absolute amount of hydrogen peroxide should be used per equivalent of oxidizable substance. Furthermore, it should be ensured that the amount of hydrogen peroxide per kilogram of aqueous solution (containing the rhodium complex/hydrogen peroxide solution) is the same. Under these circumstances, comparable results can be achieved regardless of the concentration of the hydrogen peroxide solution. This means that, when a 30% hydrogen peroxide solution is used, a correspondingly diluted rhodium complex-containing solution can be used; whereas, when a 3% hydrogen peroxide solution is used, the substrate to by oxidized must contain correspondingly less water, i.e. the dissolved substances must be present in higher concentration. To simplify handling and increase safety, it is preferable to use a 3% hydrogen peroxide solution rather than a highly concentrated hydrogen peroxide.

The aqueous solution to be oxidized can initially be heated to the desired temperature and the hydrogen peroxide can then be stirred into the solution in one or more portions. According to a preferred form of the invention, it is also possible to add the hydrogen peroxide to the aqueous solution to be oxidized at room temperature and then to heat the aqueous solution to be oxidized (and the hydrogen peroxide therein) with stirring to the desired temperature. At temperatures above 60° C. the reaction is very rapid; it is normally more or less complete within 5 to 40 minutes. If low temperatures are used, the reaction time must be extended accordingly.

It is a particular advantage that it is not necessary to immediately remove any rhodium which has precipitated. Thus, it is possible to work with one step, or to follow the first step immediately with the second step of rhodium recovery by feeding the oxygen (or oxygen-containing gas) with stirring into the solution which may still contain hydrogen peroxide. The procedure is particularly simple when air is used as the source of the oxygen.

The temperature in the second step is 80° to 120° C. If particularly mild conditions are required, a low temperature is selected, if the solution to be worked up requires severe conditions, the temperature is raised. In many cases it has proved useful to carry out the first step with temperature of 20° to 100°, in particular 30° to 100°, preferably 50° to 100°, most preferably 60° to 100° and the second step with tempertures of 80° to 120°, in particular 85° to 115°, preferably 90° to 110°, and most preferably 95° to 105° C.

The claimed process can be performed at atmospheric or elevated pressure. The pressure is preferably 0.1 to 2.0 MPa.

To recover the rhodium as completely as possible, sufficient amounts of the oxidants (hydrogen peroxide and oxygen) must be added to the solution to be treated. A measure for the amount of oxidant required is the amount of all oxidizable substances, i.e. rhodium complexes, free complex ligands, oxidizable decomposition products, as well as any organic substances still present (e.g. olefins, aldehydes, aldehyde condensation products) which can be oxidized and thus increase the amount of oxidants required.

As the total of all oxidizable substances is not known in every case, it is recommended that the hydrogen peroxide and oxygen requirements be determined in a preliminary experiment. Generally, a few grams of the aqueous solution containing the rhodium complex are sufficient for this purpose.

Normally 0.5 to 5 moles of hydrogen peroxide and 50 to 2000 liters of air/hour are used per mole of free and bound complex ligands. These include the P(III) compounds, in particular the salts of mono, di and trisulfonated phosphines. If the substrate to be treated contains other oxidizable substances, the hydrogen peroxide requirement may increase correspondingly. In most cases it has proved useful to use 0.8 to 3, in particular 1.2 to 2.6, preferably 1.8 to 2.2, moles of hydrogen peroxide and 70 to 1500, in particular 100 to 1300, liters of air/hour per mole of free and bound complex ligands.

The aqueous solution containing rhodium complex compounds should exhibit a pH value of 4 to 8, in particular 5 to 7.5, preferably 5.5 to 7. Too high or too low pH values have a negative effect on the rhodium recovery. Therefore, the pH value should be monitored during the oxidation and, if necessary, adjusted.

It is particularly advantageous to separate the precipitated, water-insoluble rhodium compound by means of a suitable solvent. Water-insoluble organic solvents such as benzene, toluene, xylene, cyclohexane, aliphatic carboxylic acids, and carboxylic acid esters can be used advantageously. Ketone with 5 to 10 carbon atoms are also suitable for this extraction.

Xylene and toluene deserve special mention, toluene being particularly desirable. The solvent can be added before the first step or before the second step; however, the inventive procedure is easiest when the solvent is added after oxidation has been completed. The separated rhodium compound is extracted at 10° to 100°, in particular 30° to 70°, most preferably 40° to 60° C.

With the claimed process it is possible to separate approximately 94 to 98% of the rhodium originally present from the aqueous solution.

The following examples are intended to illustrate the invention in more detail, but are not limitative.

EXAMPLES

The three aqueous solutions A, B and C set forth in Table 1 contain the carboxylic acid salt (sodium-2-ethylhexanoate) and carboxylic acid (2-ethylhexanoic acid).

700 g (Examples 1 to 4 and 7 to 13) or 500 g (Examples 5 and 6) of the aqueous solution are placed, together with the amount of hydrogen peroxide given in Table 2, in a 1 liter glass autoclave, equipped with jacket heating. Hydrogen peroxide is used as a 3% aqueous solution, except in the Comparative Examples 5 and 6 where a 30% aqueous hydrogen peroxide solution is used.

With vigorous stirring (500 rpm), the solution is heated over a period of 40 minutes to 98° C. (except Example 13 which is heated over a period of 30 minutes to 88° C.) and air is added to 100° C. (at 90° C. in Example 3) in accordance with the figures given in Table 2. In the Comparative Example 11, $N_2$ is used instead of air.

The pressure for the gas line given in Table 2 is maintained with the aid of a pressure regulating valve and the reaction is completed after the time shown in Table 2. Then the contents of the glass autoclave are cooled to approximately 80° C., the air supply is interrupted, the pressure is reduced, the reaction mixture is mixed with 100 g of toluene, left to cool to approximately 70° C. with stirring, and the rhodium-containing toluene phase is separated from the aqueous phase. The extraction is repeated with 100 g of toluene at approximately 40° C. The toluene phase of the two extractions are combined. The amounts of rhodium given in Table 2, in the column, "Rh content", are present in the aqueous phase.

Table 1 contains the analysis of aqueous solutions A, B and C. The conditions and results are set forth in Table 2. Examples 1, 2 and 7 to 9, as well as 12 and 13, are examples of the invention process, Examples 3 to 6, 10 and 11 serve as Comparative Examples.

TABLE 1

| Aqueous solution | Solution A | Solution B | Solution C |
|---|---|---|---|
| Rh (ppm) | 114.0 | 115.0 | 86.3 |
| P(III) | 57.7 mmol/kg | 26.0 mmol/kg | 19.5 mmol/kg |
| Na-2-ethyl-hexanoate | 166.7 mmol/kg | 167.6 mmol/kg | 125.7 mmol/kg |
| 2-Ethyl-hexanoic acid | 22.2 mmol/kg | 22.3 mmol/kg | 16.8 mmol/kg |
| Salt content (wt.-%) | ~9 | ~16 | ~12 |
| Composition (wt. %) | | | |
| TPPTS | 3.18 | 1.27 | 0.955 |
| TPPOTS | 1.59 | 2.99 | 2.24 |
| TPPDS | 0.13 | 0.06 | 0.04 |
| TPPODS | 0.18 | 0.40 | 0.30 |
| BSNS | 0.50 | 1.70 | 1.28 |

In the above table the abbreviations stand for the following:
TPPTS: $Na_3$-triphenylphosphine trisulfonate
TPPOTS: $Na_3$-triphenylphosphine oxide trisulfonate
TPPDS: $Na_2$-triphenylphosphine disulfonate
TPPODS: $Na_2$-triphenylphosphine oxide disulfonate
BSNS: Na-benzene sulfonate

TABLE 2

| Experiment | Solution | $H_2O_2$ | T | $O_2$ | t | P | Rh content |
|---|---|---|---|---|---|---|---|
| 1 | A | 2.0 | 100 | 200 | 2 | 0.25 | 1.9 |
| 2 | A | 2.0 | 100 | 200 | 6 | 0.25 | 1.3 |
| 3 | A | — | 100 | 200 | 6 | 0.25 | 18.1 |
| 4 | A | — | 100 | 1000 | 6 | 0.25 | 8.9 |
| 5 | A | 80 | 100 | — | 1 | 0.20 | 9.3 |
| 6 | A | 80 | 100 | — | 6 | 0.20 | 7.7 |
| 7 | B | 2.2 | 100 | 1240 | 6 | 0.20 | 3.5 |
| 8 | C | 2.2 | 100 | 440 | 4 | 0.20 | 2.8 |
| 9 | C | 2.2 | 100 | 132 | 6 | 0.20 | 2.9 |
| 10 | C | 2.2 | 100 | — | 6 | 0.20 | 27.9 |
| 11 | C | 2.2 | 100 | $1320N_2$ | 6 | 0.20 | 26.3 |
| 12 | B | 1.8 | 100 | 440 | 4 | 0.25 | 2.4 |
| 13 | B | 2.2 | 90 | 440 | 6 | 0.25 | 3.7 | solution: see table 1
$H_2O_2$: mole $H_2O_2$/mole P(III)
T: reaction temperature in °C. after heating
$O_2$: liter air/hour × mole P(III) Rh content in waste water in % of feed
t: reaction time in hours calculated from point when reaction temperature T reached
P: reaction pressure from time when reaction temperature reached in MPa

What we claim is:
1. A process for recovering rhodium from an aqueous solution containing rhodium complex compounds, said method comprising oxidizing said solution in the presence of an excess, based on said rhodium, of a water-soluble carboxylic acid salt of a carboxylic acid having 7 to 22 carbon atoms, and separating the rhodium as a water-insoluble compound, oxidizing said aqueous solution at

20° to 120° C. with a first oxidant comprising hydrogen peroxide or a substance forming hydrogen peroxide and with a second oxidant comprising oxygen or an oxygen-containing gas.

2. The process of claim 1 wherein complex ligands are in said aqueous solution.

3. The process of claim 1 wherein said rhodium is in a concentration of 10 to 2000 ppm by weight of said aqueous solution.

4. The process of claim 3 wherein said concentration is 30 to 350 ppm by weight of said aqueous solution.

5. The process of claim 4 wherein said concentration is 50 to 250 ppm by weight of said aqueous solution.

6. The process of claim 2 wherein said ligands are present in an amount of 0.5% to 15% by weight based on said aqueous solution.

7. The process of claim 6 wherein said amount is 0.7% to 8.0 by weight based on said aqueous solution.

8. The process of claim 7 wherein said amount is 0.8% to 4.0% by weight based on said aqueous solution.

9. The process of claim 2 wherein degradation and conversion products of said ligands are in said aqueous solution.

10. The process of claim 9 wherein said degradation and conversion products comprise at least one compound selected from the group consisting of phosphine oxides, phosphine sulfides, phosphine sulfides having organic substituents, sulfonic acids, phosphoric acids, and salts thereof.

11. The process of claim 9 wherein said product are present in a range of 1% to 15% by weight based on said aqueous solution.

12. The process of claim 11 wherein said range is 3% to 12% by weight based on said aqueous solution.

13. The process of claim 12 wherein said range is 5% to 10% by weight based on said aqueous solution.

14. The process of claim 9 wherein said ligands and products together form a salt residue and there is present 1.5% to 30% by weight of said residue based on said aqueous solution.

15. The process of claim 14 wherein there is present 4.0% to 20% by weight of said residue based on said aqueous solution.

16. The process of claim 15 wherein there is present 6.0% to 18% by weight of said residue based on said aqueous solution.

17. The process of claim 1 wherein there are organic components present which comprise at least one compound selected from the group consisting of olefins, aldehydes, alcohols, aldols, condensation products, and solubilizers.

18. The process of claim 17 wherein said organic components comprise 0.15% to 4.0% by weight of said aqueous solution.

19. The process of claim 18 wherein said organic components comprise 0.8% to 3.0% by weight of said aqueous solution.

20. The process of claim 19 wherein said organic components comprise 1.0% to 1.5% by weight of said aqueous solution.

21. The process of claim 1 wherein said carboxylic acid has 8 to 13 carbon atoms.

22. The process of claim 21 wherein said carboxylic acid is aliphatic, cycloaliphatic, aromatic, and/or araliphatic.

23. The process of claim 21 wherein said carboxylic acid is a monocarboxylic acid.

24. The process of claim 23 wherein said monocarboxylic acid is a branched aliphatic acid.

25. The process of claim 24 wherein said monocarboxylic acid is taken from the class consisting of 2-ethyl hexanoic acid, isononanoic acid, isotridecanoic acid, and mixtures thereof.

26. The process of claim 25 wherein said isononanoic acid is the reaction product of hydroformylation of diisobutylene to form a hydroformylation product followed by oxidation of said hydroformylation product.

27. The process of claim 25 wherein said isotridecanoic acid is the reaction product of hydroformylation of tetrapropylene to form a hydroformylation product followed by oxidation of said hydroformylat on product.

28. The process of claim 1 wherein said carboxylic acid salt is present at a level of 10 to 500 mols per gram atom of said rhodium.

29. The process of claim 28 wherein said level is 30 to 300 mols per gram atom of said rhodium.

30. The process of claim 29 wherein said level is 50 to 200 moles per gram atom of said rhodium.

31. The process of claim 1 wherein said aqueous solution is treated with said first oxidant and said second oxidant in a single step.

32. The process of claim 1 wherein said aqueous solution is treated with said first oxidant in a first step and is treated with said second oxidant in a second step.

33. The process of claim 32 wherein said first step is carried out at a first temperature of 20° to 100° C.

34. The process of claim 32 wherein said first temperature is 50° to 100° C.

35. The process of claim 34 wherein said first temperature is 60° to 100° C.

36. The process of claim 32 wherein said second step is carried out at a second temperature of 80° to 120° C.

37. The process of claim 36 wherein said second temperature is 85° to 115° C.

38. The process of claim 37 wherein said second temperature is 90° to 110° C.

39. The process of claim 38 wherein said second temperature is 95° to 105° C.

40. The process of claim 1 wherein said hydrogen peroxide is in the form of a water solution.

41. The process of claim 40 wherein said water solution contains 3% to 30% hydrogen peroxide.

42. The process of claim 32 wherein said rhodium is not removed between said first step and said second step.

43. The process of claim 1 wherein said oxidation is carried out under a pressure of 0.1 to 2.0 MPa.

44. The process of claim 9 wherein organic components comprising at least one compound selected from the group consisting of olefins, aldehydes, alcohols, aldols, condensation products, and solubilizers are present and said first oxidant is present in an amount in excess of that required to react with said ligands, said degradation and conversion products, and said organic components.

45. The process of claim 9 wherein organic components comprising at least one compound selected from the group consisting of olefins, aldehydes, alcohols, aldols, condensation products, and solubilizers are present and said first oxidant is introduced at a rate of 0.5 to 5.0 mols of hydrogen peroxide per mol of oxidizable substance present.

46. The process of claim 45 wherein said rate is 0.8 to 3.0.

47. The process of claim 46 wherein said rate is 1.2 to 2.6.

48. The process of claim 47 wherein said rate is 1.8 to 2.2.

49. The process of claim 9 wherein organic components comprising at least one compound selected from the group consisting of olefins, aldehydes, alcohols, aldols, condensation products, and solubilizers is present and said oxygen containing gas is air.

50. The process of claim 49 wherein said air is introduced at a velocity of 50 to 2000 liters per hour per mol of oxidizable substance present.

51. The process of claim 50 wherein said velocity is 70 to 1500 liters per hour per mol of oxidizable substances present.

52. The process of claim 51 wherein said velocity is 100 to 1300 liters per hour per mol of oxidizable substances present.

53. The process of claim 1 wherein said aqueous solution has a pH of 4.0 to 8.0.

54. The process of claim 53 wherein said pH is 5.0 to 7.5.

55. The process of claim 54 wherein said pH is 5.5 to 7.0.

56. The process of claim 1 wherein said water-insoluble compound is separated by extraction with a solvent.

57. The process of claim 56 wherein said solvent is water insoluble.

58. The process of claim 57 wherein said solvent is selected from the group consisting of benzene, toluene, xylene, cyclohexane, aliphatic carboxylic acids, carboxylic acid esters, ketone having 5 to 10 carbon atoms, and mixtures thereof.

59. The process of claim 58 wherein said solvent is xylene, toluene, or a mixture thereof.

60. The process of claim 59 wherein said solvent is toluene.

61. The process of claim 1 wherein said solvent is added after said oxidation is complete.

62. The process of claim 32 wherein said solvent is added before said first step.

63. The process of claim 32 wherein said solvent is added before said second step.

64. The process of claim 63 wherein said solvent is added after said first step.

65. The process of claim 56 wherein said extraction is carried out at an extraction temperature of 10° to 100° C.

66. The process of claim 65 wherein said extraction temperature is 30° to 70° C.

67. The process of claim 66 wherein said extraction temperature is 40° to 60° C.

68. The process of claim 61 wherein said rhodium complex compound is

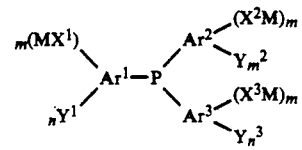

wherein $Ar^1$, $Ar^2$, and $Ar^3$ are each a phenyl or naphthyl group; $Y^1$, $Y^2$, and $Y^3$ each denote a straight or branched chain alkyl group with 1 to 4 carbon atoms, an alkoxy group; a halogen atom, an OH, CN, $NO_2$, or $R^1R^2N$ group, in which $R^1$ and $R^2$ each stand for a straight or branched chain or alkyl group with 1 to 4 carbon atoms; $X^1$, $X^2$ and $X^3$ are each a carboxylate (COO—) and/or a sulfonate ($SO_3$—) group; $n_1$, $n_2$, $n_3$ are the same or different integers from 0 to 5; M is an alkali metal ion, an alkaline earth metal ion, a zinc ion, or an ammonium or quaternary alkylammonium ion of the formula $N(R^3R^4R^5R^6)+$, in which $R^3$, $R^4$, $R^5$, $R^6$ each stand for a straight or branched chain alkyl group with 1 to 4 carbon atoms; and $m_1$, $m_2$, $m_3$ are the same or different integers from 0 to 3, at least one of $m_1$, $m_2$ or $m_3$ being equal to or greater than 1.

69. The process of claim 32 wherein said first temperature is 30° to 100° C.

* * * * *